Sept. 28, 1965

C. A. FLOOD 3,208,897

LABEL APPLYING MACHINE

Filed Sept. 28, 1961

INVENTOR.
Carl A. Flood
BY
Roberts, Cushman & Grover
ATT'YS.

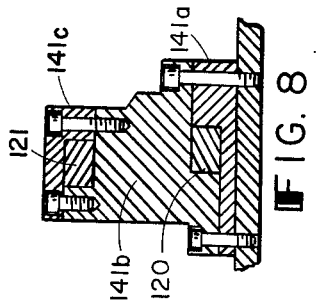
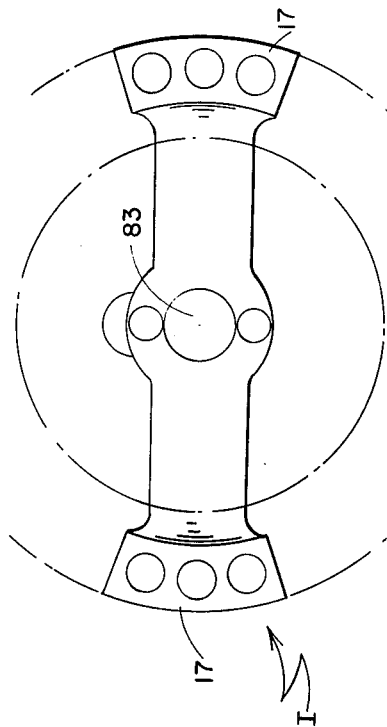
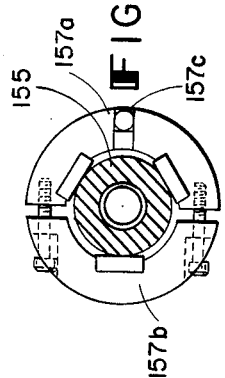
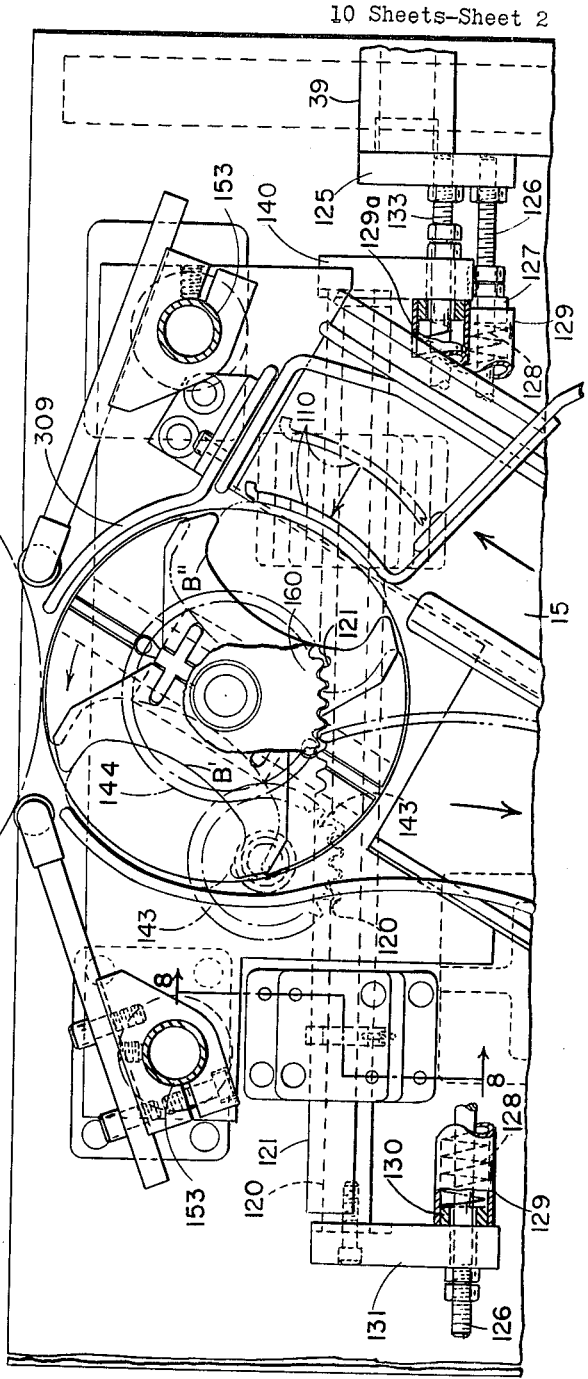

Sept. 28, 1965  C. A. FLOOD  3,208,897
LABEL APPLYING MACHINE
Filed Sept. 28, 1961  10 Sheets-Sheet 3
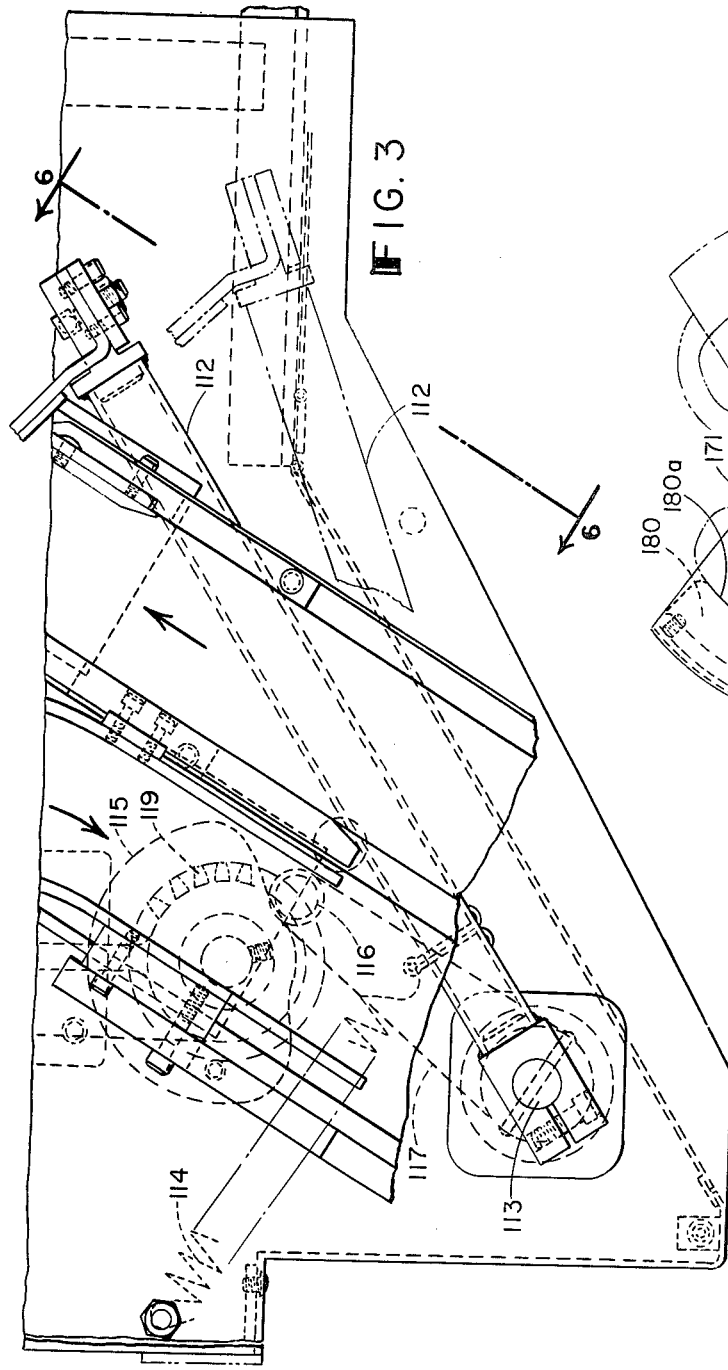
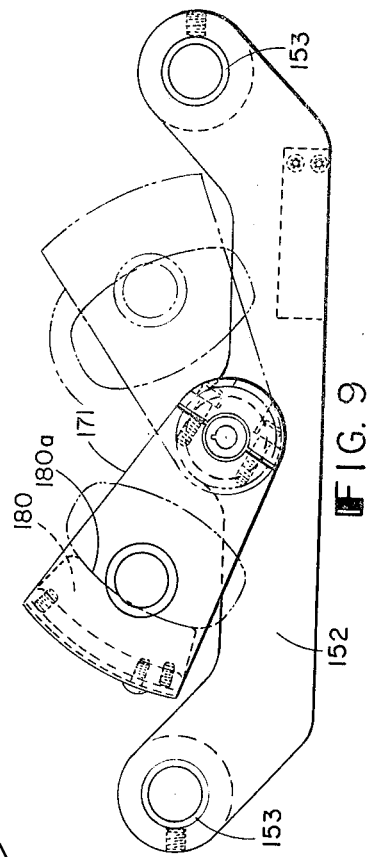

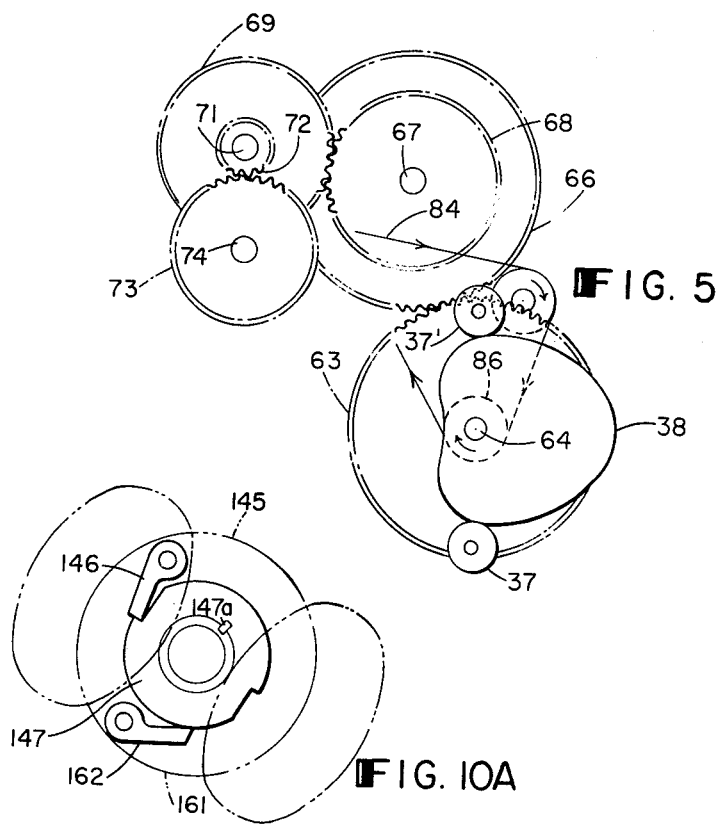
FIG. 5
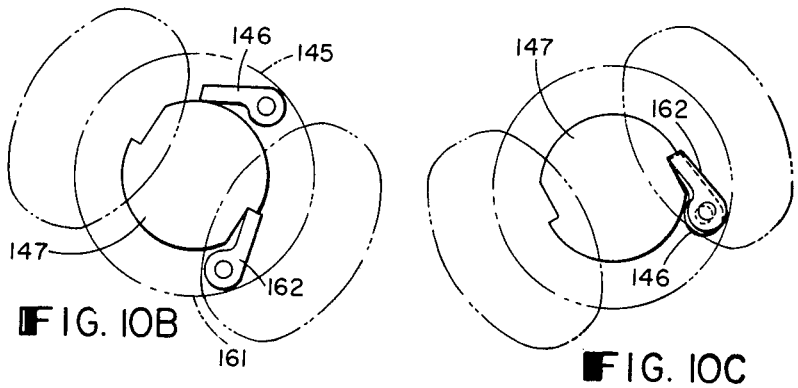
FIG. 10A
FIG. 10B
FIG. 10C

Sept. 28, 1965  C. A. FLOOD  3,208,897
LABEL APPLYING MACHINE
Filed Sept. 28, 1961  10 Sheets-Sheet 7

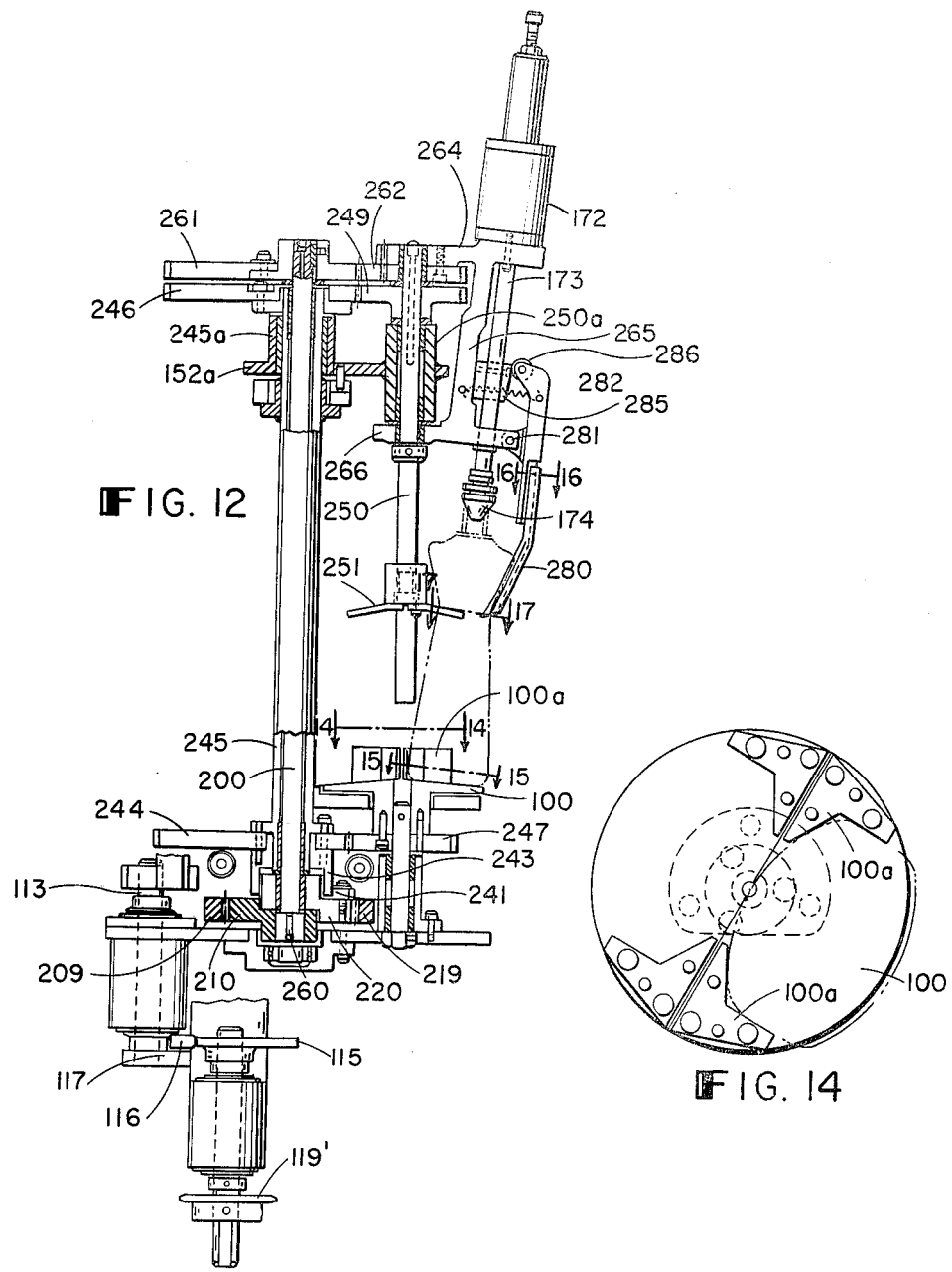

Sept. 28, 1965  C. A. FLOOD  3,208,897
LABEL APPLYING MACHINE
Filed Sept. 28, 1961  10 Sheets-Sheet 9

Sept. 28, 1965  C. A. FLOOD  3,208,897
LABEL APPLYING MACHINE
Filed Sept. 28, 1961  10 Sheets-Sheet 10

United States Patent Office 3,208,897
Patented Sept. 28, 1965

3,208,897
LABEL APPLYING MACHINE
Carl A. Flood, Framingham, Mass., assignor to Dennison Manufacturing Company, a corporation of Nevada
Filed Sept. 28, 1961, Ser. No. 141,476
16 Claims. (Cl. 156—475)

This invention relates to heat-transfer labeling machines. In the machines of this invention articles such as bottles, having generally oval cross-sections at the area to be labeled, are carried by the motion of a rotary turret past a transfer line where by means of a rotary transfer iron an image is transferred to the surface of the article or bottle from an intervening label-carrier strip which also is carried past the transfer line. During the transfer the speeds of the iron, label-carrier strip and article (hereinafter referred to as a bottle) must all coincide. This is best accomplished by rotating the iron continuously at constant speed, by causing the rotary turret to carry the bottle surface past the transfer line at the constant speed of the iron, by giving the label strip a basic constant rate of feed, and by modifying the basic strip speed in the region of transfer so that it too equals the iron and bottle speed during the transfer. These speed controls can best be obtained through the use of a cam having periods of constant throw which are used in driving the turret and the strip-speed modifying means. It is then possible to establish a fixed relation between the drive of the iron and the basic strip feeding means and this cam, and to regulate accurately the relation between the constant-motion throw of this cam and the strip-speed modifying means and the relation between the same constant-motion throw of the cam and the turret motion. Machines of this type are disclosed in United States Patent No. 2,981,432, granted April 25, 1961. That patent discloses a machine which can be fitted with various turrets for various bottles, the turret of FIGS. 14—16 being adapted for generally oval bottles.

It will be seen that the curvature section of the bottle being labeled should not, strictly speaking, be truly oval at the time of transfer, but should be arcuate, centered at the turret axis. The bottles however may be spoken of in some cases as oval, and in other cases more exactly as having arcs of curvature.

The invention is especially useful for labeling bottles of plastic material which are deformable and which are held inflated during the transfer. The invention provides mechanical means for controlling the curvature of the bottle surface being carried past the transfer line. The control may be primarily for the purpose of preventing the inflation from distorting one part of the bottle relative to another part, for instance preventing the mid-height of the bottle from swelling out toward round while the base retains its original generally oval shape. Or with other designs of bottles the control may be such as to force a section of the bottle in to the proper contour so that the area to receive the label conforms to a surface having the same or nearly the same axis as the turret.

A further feature of the invention relates to a special new relation between the motion of the turret and that of other cooperating parts of the machine, and mechanism for introducing this new relation.

It is desirable from several standpoints to be able to design the turret in such manner that the radius of movement around the turret axis can be relatively small. This permits use of bottle shapes in which the oval is not as flat or slim as if the radius of movement were larger. To accommodate larger bottles in a turret of given size, or to accommodate bottle shapes which of themselves demand a relatively small radius of movement around the turret axis, it will often be desirable to reduce the number of stations in the turret from the three shown in said patent to only two. However, merely reducing the turret stations to the practical minimum of two does not take full advantage of the capabilities of the general organization of the machine represented by that patent.

With two stations, or places, for bottles, per turret, the turret is called on to turn 180° for each bottle labeled. As before mentioned a constant motion cam operates the turret and in definite fixed relation to the turret movement operates strip-speed modifying means which brings the speed of the label-carrier strip from its basic feeding speed to the speed of the iron and bottle. This is essentially an oscillating slide which draws the strip forwardly during half the time and equally rearwardly during half the time. Labeling the bottle can be done within less than 120° of turret movement. For example, the actual label-receiving surface of an oval bottle will be unlikely to take up more than 90° of the circumference of the turret. Rotation of the turret as much as 180° by the constant motion cam which operates the strip-feed modifying mechanism, would, if accomplished by usual connections, cause an unnecessarily long forward drawing of the strip by the oscillating slide during 180° of cam movement and consequent equal backward drawing during the next 180°.

Where, as in my United States Patent for Transfer Applying Machine For Conical Surfaced Bottles, No. 3,139,-368, granted June 30, 1964, a conical iron is used and the strip speed and angular direction are further modified by a swinging guide operated by the constant motion arm, a similar unnecessarily long swing of the strip would result under the condition just mentioned.

For a turret having a given number of stations, the required diameter of the iron depends upon the frequency with which bottles are presented by the turret, which in turn depends not only upon the distance from one station of the turret to the next but also upon the idle time in the cylcle of rotation of the turret. The iron rotates continuously and could have the smallest diameter if the turret also rotated constantly. Some dwell of the turret is desirable, but it is evident that the longer the turret dwells the greater must be the circumferential path of the iron and hence the diameter of the iron. Thus, while merely reducing the turret stations from three to two might in some cases permit the diameter of the turret to be reduced this will not insure that the iron can be made any smaller. If the two-station turret remained idle half the time as customary with three-station turrets, the iron for the two-station turret might even need to be made larger in case a step of indexing travel of the two-station turret were a little longer than such a step of the three-station turret. This latter would be likely, so there seems to be little possibility of reducing the iron size merely by going from three stations to two.

Before going into details about the turret motion according to the present invention it may be explained that the constant motion cam is here used to advance the turret in both of the cam strokes instead of during only one of the cam strokes. The advance during one cam stroke may be 120° which is appropriate to the labeling operation at the transfer line. Then the motion of the strip-speed modifying means (such as the oscillating slide) in one direction is such as corresponds in time to this 120° advance of the turret, and not to the full 180° through which the turret will advance for each bottle. Excess overtravel of the strip-speed modifying means is thus minimized. The same will be true of the motion of a swinging guide operated by the constant motion cam in the case of a conical iron.

One stroke of the came will cause 120° advance of the turret. The next oppositely directed stroke of the cam will cause a further 60° advance of the turret. Thus in one revolution of the cam the turret revolves the 180° required for one bottle.

Returning now to the matter of the diameter of the iron, let it be assumed that the iron is to be a double-iron, having two diametrically opposed active sectors. Under these conditions, if the two-station turret were to dwell for a period approximately equal to its time of rotation, the radius required for the iron would be approximately double the radius from the axis of the turret to the bottle surface. On the other hand, were the turret to dwell for one-fouth of the time and rotate three-fourths of the time, the radius required for the iron would be approximately ⅔ times the radius of the turret. In actual practice, the radius of the iron would bear a slightly larger ratio to the radius of the bottle surface at the turret than cited in these examples because of diminished steepness of throw of the cam at the ends of its strokes and because of slight loss of motion between the rotation of the cam and the rotation of the turret. However, the above examples sufficiently illustrate the way in which the invention makes it possible to minimize the size of the iron.

Similarly with a single iron, if the two-station turret were to dwell for one half the time, the diameter of the iron would need to be approximately equal to the diameter of the turret, whereas if the turrent were to dwell for only one-fourth the time, the diameter of the iron would need to be approximately two-thirds of the diameter of the turret.

It is, of course, an advantage in itself that the iron does not require such a large diameter when the fraction of time taken up by dwell is reduced.

Of even more importance than minimizing the size of the iron is the increase in productivity which this invention imparts to two-station turrets.

Suppose we have two machines with two-station turrets of equal diameter, one machine having 180° turret rotatino during that stroke of the main cam during which a transfer occurs, and the other machine according to this invention having 120° turret rotation during this stroke, the irons of both machines to make one-half revolution during this stroke (being single irons).

The iron diameter in the latter or 120° machine should be about two-thirds of the iron diameter in the former or 180° machine. Linear speed of iron, label-carrier strip and bottle surface is a critical limiting factor in heat transfer labeling, in that the quality of the work deteriorates if this linear speed is too high. For a given such linear speed the iron of the 120° machine can be operated at an r.p.m. equal to 150% of the r.p.m. of the iron of the 180° machine. During a given work period, the iron with the faster r.p.m. will effect a correspondingly greater number of transfers.

A further object of the invention is to provide for labeling a tapered bottle as a part-cylindrical surface, by which I mean that the labeled surface if extended circumferentially would be a cylinder. As well appear, the taper may be from the region of the base to a relatively small waist near the mid-height of the bottle, as in the case of a bottle shape sometimes referred to as of flask type.

Other objects and advantages of the invention will appear in this specification wherein the invention is explained by a description of two examples thereof.

In the accompanying drawings:

FIG. 2 is a view in the nature of a plan, to a larger scale, showing particularly a portion of the bottle turret with some parts broken away and omitting some parts particularly at the upper portions of the machine;

FIG. 3 is a plan view which supplements FIG. 2 and slightly overlaps the part of FIG. 2 lying lowermost in FIG. 2;

FIG. 5 is a diagrammatic view in the nature of a plan view taken at a lower level than FIG. 1;

FIG. 7 is a sectional view taken on line 7—7 of FIG. 4;

FIG. 8 is a sectional view taken on line 8—8 of FIG. 2;

FIG. 9 is a fragmentary view mainly in plan, showing some upper parts which are omitted from FIG. 2;

FIGS. 10A, 10B and 10C are diagrams showing successive positions of the turret and parts of its driving means;

Figure 11:
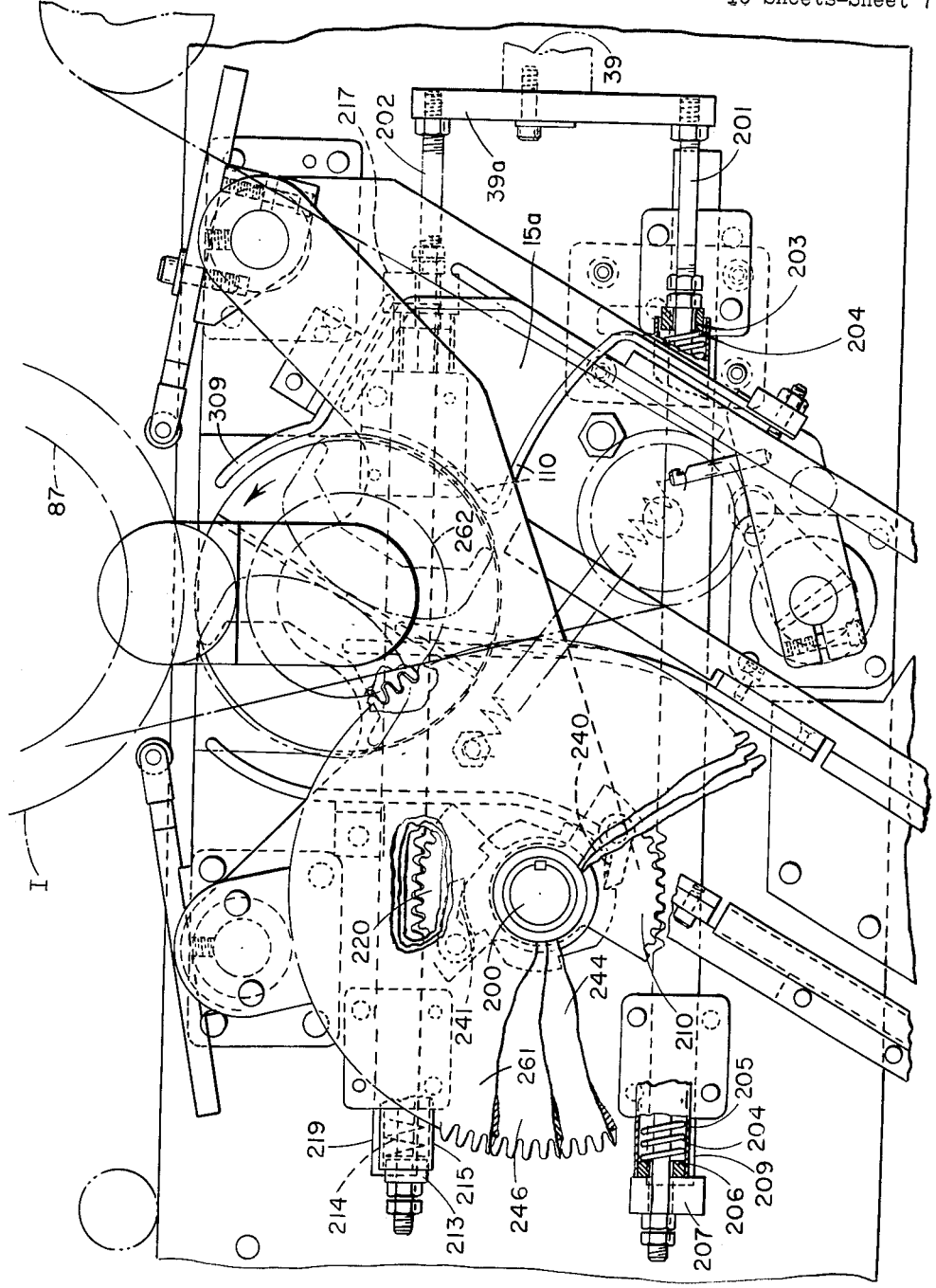
Figure 15:
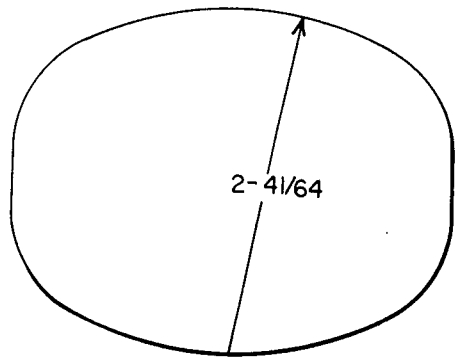
Figure 17:
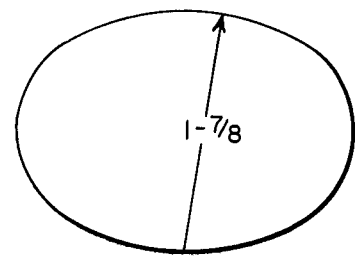
Figure 16:
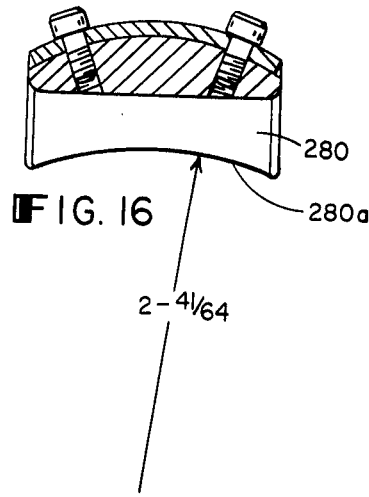
Figure 13A:
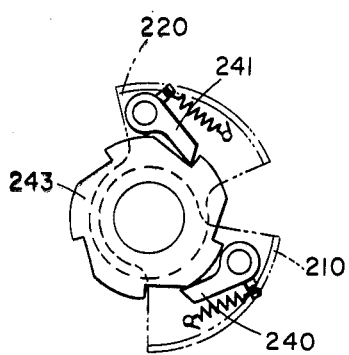
Figure 13B:
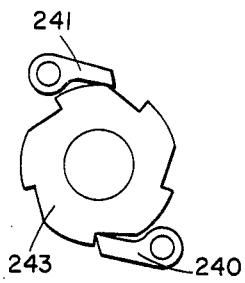
Figure 13C:
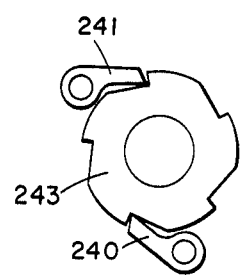
Figure 18:
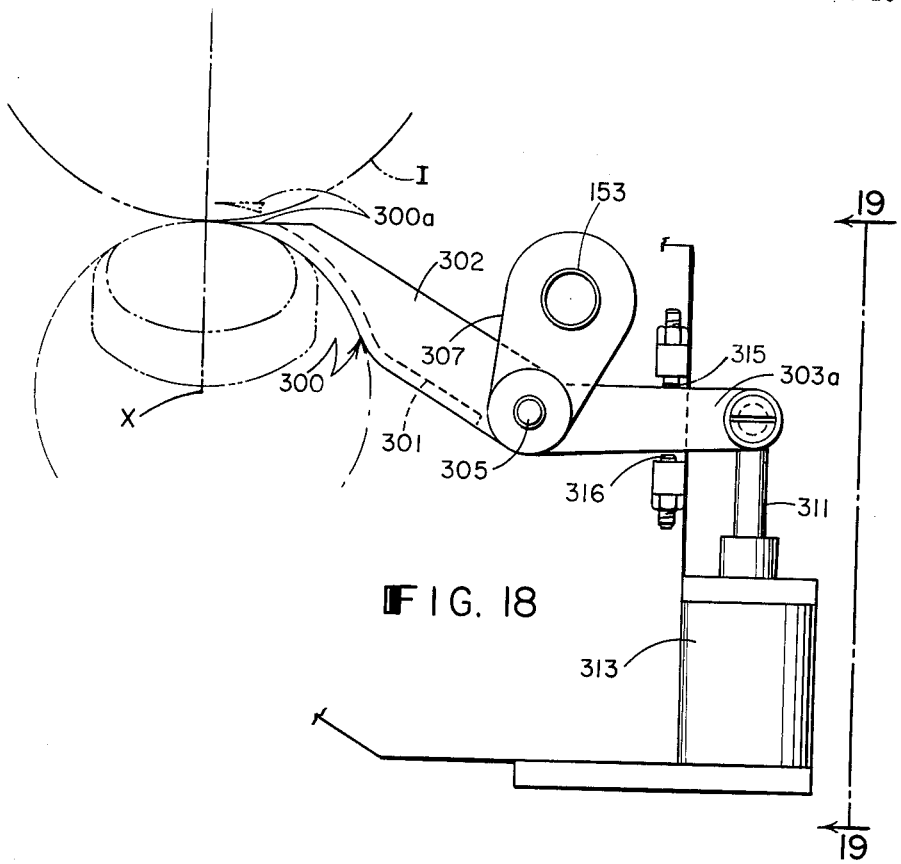
Figure 19:
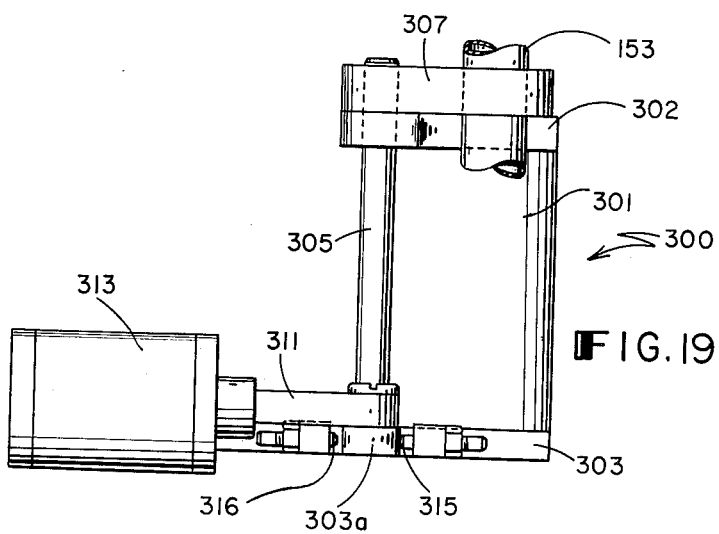

FIG. 11 and subsequent figures illustrate a second embodiment;

FIG. 11 is a plan view generally similar to FIG. 2 of the first embodiment, but is taken at a higher level so as not to omit some parts which correspond generally to parts omitted from FIG. 2. FIG. 11 saves space by omitting the label-applying iron and by taking in some structure similar to that of FIG. 3 of the first embodiment;

FIG. 12 is a view taken partly in side elevation from the right side of FIG. 11 and partly in vertical section;

FIGS. 13A, 13B and 13C are diagrams showing successive positions of the turret and parts of its driving means;

FIG. 14 is a sectional view taken on the line 14—14 of FIG. 12;

FIG. 15 is a sectional view taken on the line 15—15 of FIG. 12, showing, however, only a section of the bottle;

FIG. 16 is a sectional view taken on the line 16—16 of FIG. 12;

FIG. 17 is a sectional view taken through the waist of the bottle of FIG. 12 when this is not forced out of its natural shape;

FIG. 18 is a diagrammatic view, in plan, showing mechanism for confining the bottle as the surface of the latter approaches the transfer line; and FIG. 19 is a diagrammatic view taken in elevation from the right side of FIG. 18.

Figure 1:
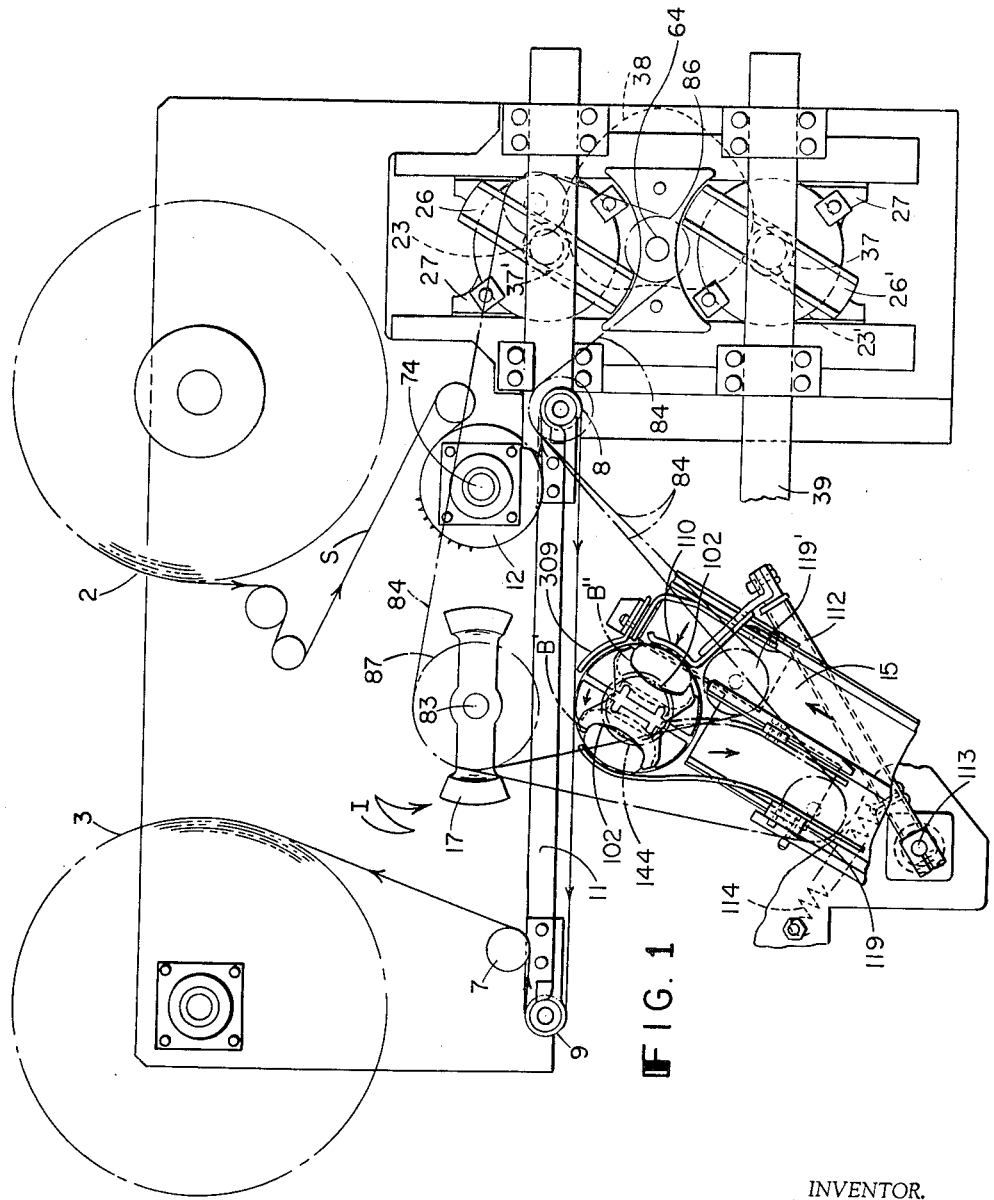
FIG. 1 is a diagrammatic plan view showing the general organization of a heat-transfer labeling machine, exclusive of the turret and omitting many parts.

As in said Patent No. 2,981,432, the machine of which the general organization is shown in FIG. 1 includes a rotating heated applicator iron I here shown as having two raised active sectors 17, 17. The label-carrier strip S is unwound from a spool 2, fed at a metered rate by a sprocket wheel 12 to and around the guide roll 8 at one end of a reciprocating slide 11, thence past the line of action of the iron, where the image of a label is transferred from the strip onto the bottle surface, around another roll 9 at the other end of slide 11, around an idle roll 7, and becomes wound up on a spool 3.

A generally heart-shaped cam 38 on shaft 64 engages followers 37, 37' best seen in FIG. 1A, on a slide 27 (FIG. 1) to reciprocate this slide. The two opposite strokes of the cam 38 are similar, and all excepting the first 10° and last 10° of each stroke imparts constant motion to the slide 27.

Angularly adjustable cam blocks 26 and 26' act through followers 23 and 23' to impart proportionate parts of the motion of the slide 27 to the slide 11 which carries the rollers 8 and 9, and to another slide 39 which operates to advance the turret.

There is a definite fixed relation between the speed of the iron I and the speed of the heart-shaped cam 38 such that one raised sector 17 rotates 180° while the cam 38 rotates 360°.

For example, the shaft 83 that rotates the iron I may be connected by sprocket 87 (FIG. 1), chain 84 and sprocket 86 (FIG. 1A) to the shaft 64 that rotates the cam 38.

One raised sector 17 will pass the line of transfer per one revolution of the cam 38, and this passage of a sector 17 past the line of transfer will fall wholly within and be less than the time of one stroke of the cam, that is, wholly within and less than the time of 180° of cam rotation.

There is a definite fixed relation between the speed of the iron I and the speed of the sprocket wheel 12, such that the label-carrier strip is fed by the sprocket wheel at a constant speed which is the average speed at which the strip is used by the machine, this average speed being considerably less than the linear speed of the iron.

FIG. 5 shows the shaft 74 which drives the sprocket 12 as connected to the shaft 64 which drives the cam 38, the connections including a train of gears 63, 66, 68, 69, 71 and 73.

By means of the adjustable cam block 26, the slide 11 is given a stroke such that the speed of the label-carrier strip S is locally modified so that during a time interval in which a raised sector of the iron is passing the transfer line, i.e., is active, the speed of the label-carrier strip locally conforms to the speed of the iron even though the strip is being unwound and wound up again at the slower average speed determined by the sprocket wheel 12.

Figure 4:
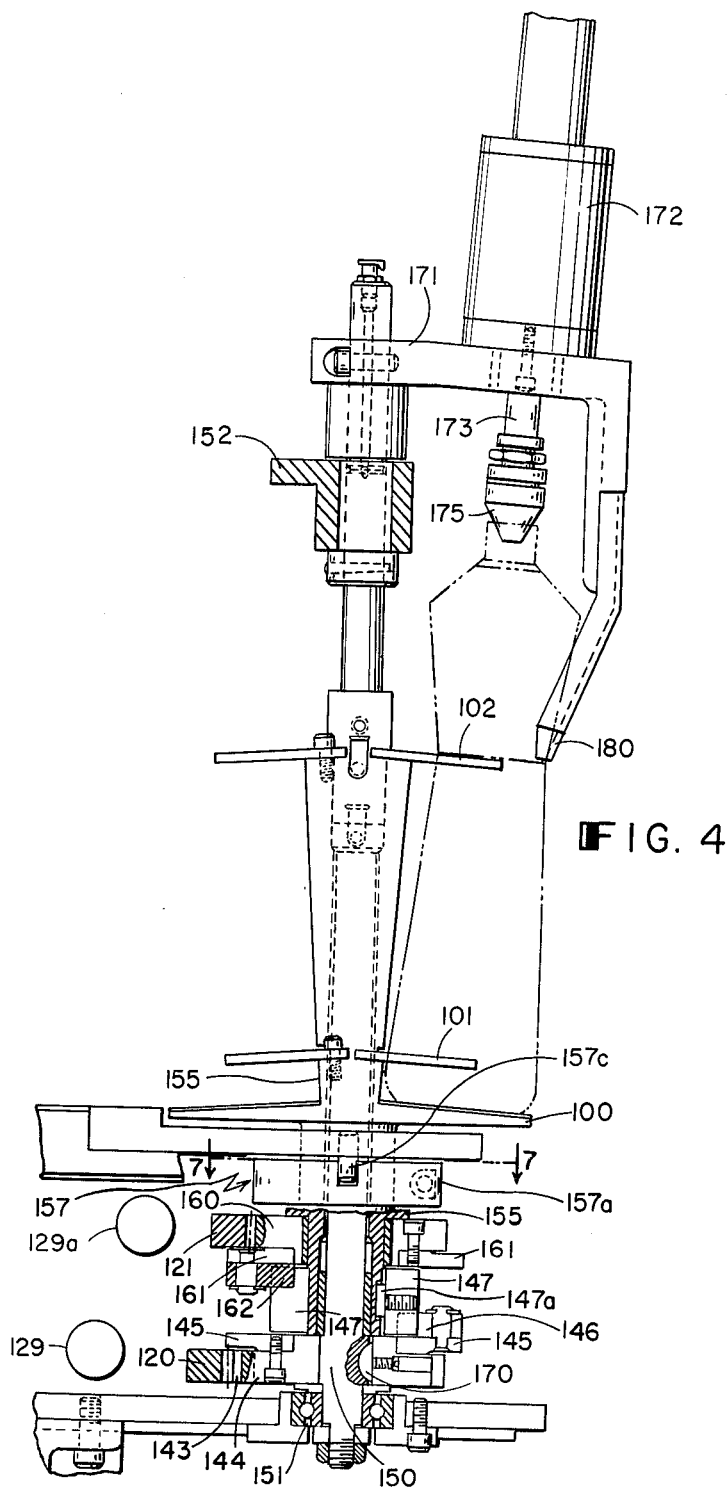
FIG. 4 is a view taken partly in side elevation from the right side of FIG. 2, and partly in vertical section.

In the machine of the first embodiment of the invention a turret is shown in FIG. 4 as comprising a platform 100 on which bottles stand and two spiders 101, 102 within the recesses of which the bottles fit, the spiders and the platform being rotatable.

The spiders 101, 102 have bottle-holding spaces or stations located 180° apart, these spaces being shaped to fit the bottles while leaving an outer face portion of the bottle exposed for application of the label.

The bottle for which this embodiment is especially intended is of the flask type. As indicated in outline, in FIG. 4, the waist of the bottle is smaller than either the base or the part immediately above the waist. The bottle section is not truly oval, but is selected so that an outwardly-facing surface portion between the waist and base is cylindrically curved. The platform 100 has an incline as shown in FIG. 4 such that this outwardly-facing cylindrically curved surface portion of the bottle surface between the waist and base has for its axis the vertical axis of the turret. This surface portion of the bottle receives the label as it rotates tangentially of the iron I. The iron is not shown in FIG. 4 but may be considered to be acting on the bottle at the right side thereof represented by a vertical line below the waist, the axes of the iron and turret being parallel.

Whereas FIG. 4 shows the bottle while the center of its label-receiving surface portion is passing the line of transfer, FIG. 2 shows the turret as having rotated the bottle past the line of transfer to a position where the turret dwells. The motion into the position of FIG. 2 is a turret rotation of 120° and takes place within the time of one stroke of the cam 38, namely that stroke of the cam during which 90° rotation of the iron causes an iron sector 17 to pass the transfer line. During the dwell of the turret the labeled bottle B' remains in place. A new bottle B'' is inserted in the turret diametrically opposite to the labeled bottle. For this purpose there may be provided a pusher device including upper and lower members 110 (FIGS. 2 and 6) each having a face curved to fit the bottle and carried by a post 111 attached to a swinging arm 112 which is clamped to a shaft 113 (FIGS. 3 and 5).

Any suitable driving connection operating in timed relation to the turret can operate the shaft 113 to swing the pusher device.

A convenient form of drive for the pusher device consists of a spring 114 which biases the tubular arm 112 toward the turret as indicated in FIG. 3, under control of a rotary cam 115 (FIG. 3) which acts on a follower 116 on an arm 117 fast on the shaft 113. Thus the cam 115 permits the pusher device to push the bottle into the turret during the time the turret is at a dwell in the FIG. 2 position. The shaft 115a which carries the cam 115 also carries a sprocket 119 fast thereon which is driven at one revolution for each revolution of the main cam 38 and each half revolution of the double iron I. The chain 84 that interconnects the cam shaft 64 and the iron shaft 83 may drive this sprocket 119 as indicated in FIG. 1. In that figure, 119' represents an alternate position of a similar sprocket for the second embodiment of the invention.

Figure 6:
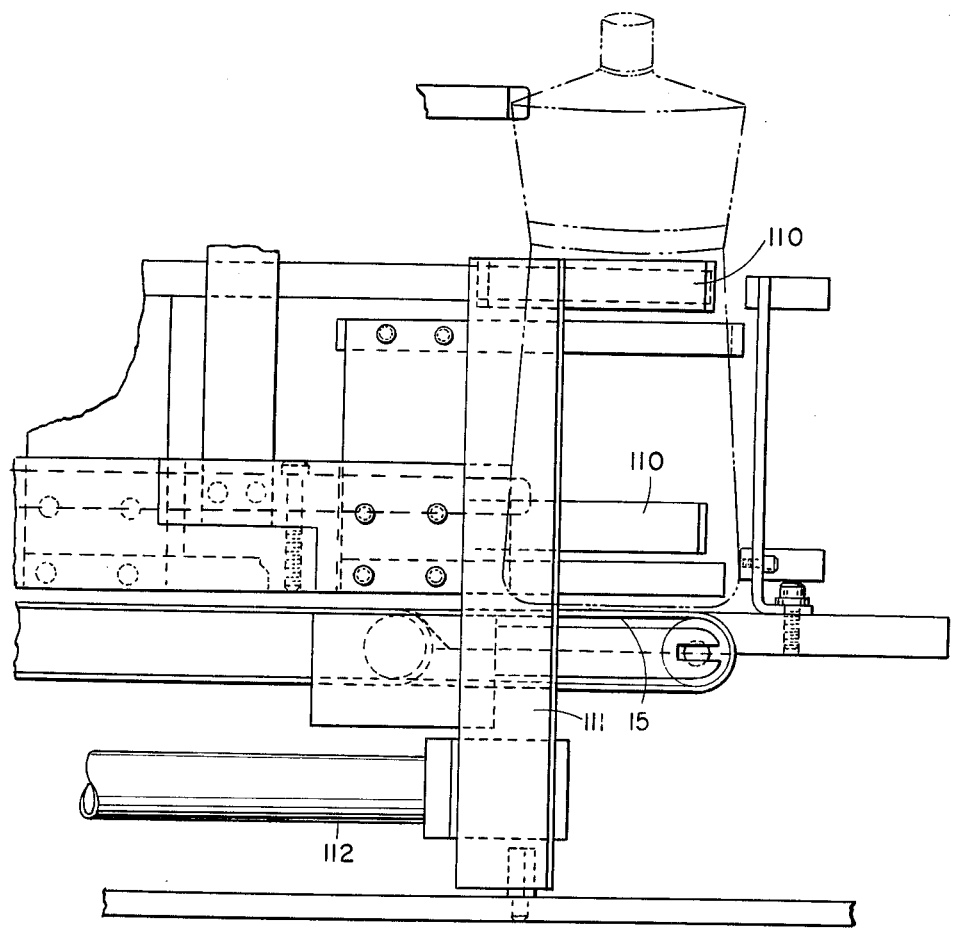
FIG. 6 is a fragmentary elevation taken from the view line 6—6 of FIG. 3.

As will appear from FIGS. 6 and 2, the pusher device swings across an endless bottle-feeding conveyor 15 to insert the foremost bottle thereon into the turret. For simplicity of illustration, the pusher device is shown in full lines in FIG. 2 as having completed the insertion of the bottle, although this will not be completed until a little after the turret has come to a stop at the FIG. 2 position. In the broken lines position of FIG. 2 the pusher is shown in motion, part way through its stroke.

The turret motions are desrived from the slide 39 through two rack bars 120 and 121.

Rack bar 120 is driven to the left in FIG. 2 through a yoke 125, a rod 126 fast thereto, a collar 127 which abuts a spring 128 (enclosed in a tube 129), a collar 130 against which the left end of spring 128 abuts, and a yoke 131 to which the rack bar 120 is fastened. There is clearance betwen the rod 126 on the one hand and the collar 130 and yoke 131 and there is also clearance between the collar 127 and tube 129. Thus the drive to rack 120 can yield by compression of spring 128 in case of a jam while it is being driven to the left.

Rack bar 121 is driven from slide 39 through yoke 125, rod 133 and a generally similar yielding connection to a yoke 140 to which the rack 121 is secured, this connection being arranged to yield if there is a jam while rack 121 is being driven to the right.

FIG. 8 shows interconnected stationary guide blocks 141a, 141b and 141c which define guide slots in which the rack bars 120, 121 are slidable. From this figure and FIG. 2, it will be seen that these bars are rectangular and each is cut away to form teeth only in the general region where it is to mesh as a rack.

Rack 120 meshes with an idler gear 143 which in turn meshes with a gear 144 (FIGS. 1 and 4). In FIG. 4 gear 143 is almost altogether behind gear 144. On gear 144 is fastened a lower pawl carrier 145 (FIG .4). This ring carries a spring-pressed pawl 146 engageable with a rotatable ratchet 147 whose outline is shown in the diagrams of FIGS. 10A to 10C.

The central shaft of the turret is indicated at 150 and is rotatable in a bearing 151 (FIG. 4). Around this central shaft, with the central shaft rotatable in either direction therein, is a sleeve 155, also rotatable. Sleeve 155 extends out radially to form the bottle-supporting platform 100 and also carries the spiders 101, 102.

The ratchet 147 is keyed to this sleeve 155 by key 147a. A friction brake, indicated generally at 157, prevents overrunning of the sleeve 155 and prevents reverse movement of the sleeve from being caused by backward rotation of neighboring ports. The friction brake 157 consists essentially of opposed members 157a and 157b yieldingly urged together as in FIG. 7 to grasp the sleeve 155 yieldingly, the brake being prevented from turning by a pin 157c extending from a stationary part of the machine.

The rack 121 meshes directly with a gear 160 (FIGS. 2 and 4) to which is fastened a pawl-carrier ring 161 carrying a spring-pressed pawl 162 also acting upon the ratchet 147.

Pawl carrier ring 145 is driven counterclockwise and pawl carrier ring 161 is driven clockwise when the slide 39 moves to the left, and pawl carrier ring 145 is driven clockwise and pawl carrier ring 161 is driven counterclockwise when the slide 39 moves to the right.

The gear ratio between the cam 38 and the two pawl carrier rings is such that during the 180° rotation of cam 38 from one end of its stroke to the other the two pawl carrier rings will each rotate 122°.

The turret reaches its position of FIG. 2 by movement of the pawl 146 from the position of FIG. 10C to the position of FIG. 10A. This pawl moves idly through 2°, then picks up a shoulder on the ratchet and turns the ratchet and turret through 120° to the FIG. 10A position. During this movement the pawl 162 moves idly over the ratchet. It is during this movement of the turret that the label is transferred.

As the cam 38 takes its next stroke, in the opposite direction, and slide 39 moves to the right, the pawl 162 first moves idly through 62°, during which time the turret dwells. A bottle to be labeled is pushed onto the turret platform during this dwell. At the FIG. 10B position the pawl 162, following its 62° idle movement, picks up a shoulder on the ratchet. Thereupon, the ratchet is driven 60° by pawl 162 until it attains the FIG. 10C position. As will be evident from the diagrams, pawl 146 moves idly over the ratchet during this stroke of the cam 38 and slide 39.

Suitable guides divert the labeled bottle from the turret and onto an outgoing conveyor.

The machine of this embodiment is provided with mechanism generally similar to that of said patent for holding the bottles inflated under air pressure during the transfer. The gear 144 is keyed at 170 to the main central shaft 150 (FIG. 4), so that this shaft participates in the 122° movement of the pawl carrier 145 in both directions. The shaft 150 is mounted in an upper bearing in a stationary cross-piece 152 which is supported by two stationary tubes 153 (FIG. 9). FIG. 2 is taken at a level lower than the cross-piece 152 but locates the two tubes 152.

The central shaft 150 carries fast thereon a bracket 171 carrying an actuating cylinder 172 adapted to project and to retract, perpendicularly to the inclined platform 100, a tube 173 carrying an air nozzle 175 which in the projected position shown in FIG. 4 fits into the bottle mouth and holds the bottle.

The actuating cylinder 172 may either be constructed as in either of FIGS. 11 or 13 of said patent in which the tube carrying the nozzle is projected by air pressure intermittently applied to a piston within the cylinder and is retracted by a spring within the cylinder, or as in United States Patent No. 3,064,714, granted November 20, 1962, in which the tube is retracted by air pressure intermittently applied to a piston and projected outwardly by a spring when the intermittently applied air pressure is removed from the piston. A suitable cam operated valve, not shown, controls the intermittent air supply as in said patent or application.

FIG. 9 shows the bracket 171 in full lines in one extreme position corresponding to FIG. 2, and in broken lines in its other extreme position. The nozzle will retract from the bottle when the FIG. 2 position is reached by the bottle, return to its broken line position of FIG. 9, and then when or shortly after the bottle starts its movement which will carry it across the transfer line, projects into the mouth of the bottle and inflates the bottle by air pressure and holds it so during the transfer.

A backing member 180 depends from bracket 171 and engages the outwardly facing surface of the bottle just above the top of the area to be labeled. The bottle shown flares outwardly from the waist upwardly, and this backing member preferably presents an area making contact with this outwardly flaring portion. The lower edge portion of the backing member, making contact with the bottle at the waist thereof and indicated at 180a in FIG. 9 is preferably a concave surface centered about the axis of the turret. The waist of the bottle is thus constrained to a curvature which is parallel to the curvature of the lower portion of the label-receiving area of the bottle, namely concentric around the turret axis.

The second embodiment of FIG. 11 and subsequent figures is applicable to the same general organization of heat-transfer labeling machine that is illustrated in FIG. 1.

The bottle shown in connection with the second embodiment has on its label-receiving side a smaller radius of curvature and therefore requires to be moved in an arcuate path of less radius. Moreover, this bottle has at the waist portion of its label-receiving side a smaller radius of curvature than the radius of curvature of the lowest part of the label-receiving area.

Important differences of the second embodiment are that this provides turret structure which permits bottles to extend in close to the axis of the turret, and turret structure adapted to handle bottles which at the top and bottom of the zone of label reception have markedly different curvatures and to temporarily reform such bottles so that during the transfer these curvatures are substantially equal.

In the turret, the bottle sits on a platform 100 (FIG. 12) which slopes downwardly from an unobstructed center and which is provided with spaced notched backing blocks 100a between which the lower part of the bottle is received. The lower part of the bottle can thus extend into the center of the platform.

The bottles are pushed from a column on conveyor 15 onto a platform 15a (FIG. 11). A pusher device, operated by a mechanism similar to that of FIG. 6, for placing the bottles in the turret comprises two members 110 each having a face curved to fit the bottle and carried by a post 111 attached to a swinging arm 112 clamped to a shaft 113. Shaft 113 is operated by driving connections like those of the first embodiment, including a sprocket 119′ (FIG. 12) driven by the chain 84 as indicated in FIGS. 1 and 5.

In FIG. 11 the mechanism for transforming reciprocating motion of the slide 39 into rotary motion of parts of the turret is offset from the turret axis and generally centered around a vertical shaft 200 (FIGS. 11 and 12).

Slide 39, through a bracket 39a, reciprocates two rods 201, 202, one on either side of the shaft 200.

As rod 201 is moved to the left, a collar 203 near the right end of rod 201 acts through a spring 204 within a tube 205 to force a collar 206 near the left end of rod 201 toward the left. Collar 206 is fast to the tube 205, so as to carry the tube with it. A lug 207 at the left end of the tube is connected to a rack bar 209, the teeth of which mesh with a segment gear 210 rotatable about the axis of shaft 200. There is clearance between the rod 201 and the collar 206 and lug 207, so that if undue resistance is encountered as the rack bar moves to the left, the drive to this rack bar can yield by compression of the spring 204.

Similarly as the other rod 202 moves to the right a collar 213 near the left end of this rod acts through a spring 214 to move a lug 217 at the right end of a tube 215, this lug being connected to a second rack bar 219, the driving connections to this rack bar being similar to those of the first rack bar 209 except that they are oppositely arranged. The teeth of rack bar 209 mesh with a second segment 220 rotatable about the axis of shaft 200. To avoid confusion in FIG. 12 cross-hatching of this second segment gear has been omitted.

Segment gear 210 and segment gear 220 are each rotatable in both directions and carry pawls 240, 241 respectively (FIG. 13A), urged by springs against a ratchet wheel 243. Ratchet wheel 243 is secured to a gear wheel 244 and to a sleeve 245 which carries near its upper end a gear wheel 246 the same in size as gear wheel 244.

Gear 244 meshes with a gear 247 which is fast to the bottle supporting platform 100 of the turret. Gear 246 meshes with a gear 249 which is fast to a spindle 250 coaxial with the platform 100 and carrying a spider 251 for engaging the bottles at their waists.

The diagrams of FIGS. 13A, 13B, and 13C show how the turret platform and overhead spindle 250 and its spider are given a unidirectional step by step rotation. It will be seen that because of interposed gearing these parts will rotate oppositely to ratchet wheel 243 and with larger angular steps.

Starting at the position of FIG. 13C, motion of the slide 39 and two racks 209 and 219 to the right causes the pawl-carrying segments to move to the position of FIG. 13A, in which movement the pawl 241 rotates the ratchet wheel enough to index the turret and overhead spindle and spider 120° counterclockwise, the pawl 240 being idle. It is during this indexing that the transfer takes place.

Thereupon, in the first part of movement of the slide and two racks to the left, both pawls are idle until the position of FIG. 13B is reached. Beginning at that position, pawl 240 becomes active and rotates the ratchet to the position of FIG. 13C, resulting in a further 60° indexing of the turret.

A stationary cross-piece 152a supported like the cross-piece 152 of the first embodiment holds a stationary upper bearing 245a for the sleeve 245. In this case, the cross-piece 152a also holds a stationary bearing 250a for the spindle 250.

It has been seen that the pawl-carrying segment gear 210 has an oscillating motion due to the reciprocation of rack bar 209. This gear 210 is keyed at 260 to shaft 200, which latter carries at its top a gear 261, meshing with a gear 262 which turns freely on the axis of spindle 250.

To gear 262 there is fastened one upper arm 264 of a generally I-shaped frame 265, the corresponding lower arm 266 of which is pivoted on the spindle 250.

The actuating cylinder 172 is mounted on the top of the I-shaped frame 265 and the projectable and retractable air tube 173 and nozzle 174 are arranged in position for the nozzle to engage in the bottle opening as in the first embodiment. Oscillation of the I-shaped frame causes the nozzle to accompany the bottle past the transfer line, then return and engage the next bottle in a manner similar to the action of the nozzle in the first embodiment.

The machine of the second embodiment includes a member 280 having the function of the member 180 of the first embodiment of confining the bottle at its waist and restraining it against bulging out as a result of the inflating air pressure. The member 280 is here given the additional function of distorting or reforming the bottle from its normal shape.

For example, at the largest lower part of the bottle the contour of the bottle may be as shown in FIG. 15 (a section on line 15—15 of FIG. 12) where a central portion of one of the two less-curved arcuate sides may have a constant radius of for example 2⁴¹⁄₆₄ inches as shown. The normal contour at the waist of the bottle may be as shown in FIG. 17 (a section on line 17—17 of FIG. 12) where a central portion of one of the two less-curved arcuate sides may have a constant radius of 1⅞ inches as shown.

Now, since the coresponding radii are different at these two levels, the bottle could not ordinarily be handled as though a part of a cylindrical surface were being labeled. Some such expedient as set forth in my Patent No. 3,139,368, for Transfer Applying Machine for Conical Surfaced Bottles, granted June 30, 1964, would be needed if there were even a small difference between the curvatures at the two levels so that, in effect, a conical area was to be labeled.

However, I have discovered that under some conditions, it is preferable to bring the curvatures at the two levels into coincidence by means of distortion, so that the area in between these two levels can be labeled in the manner of a portion of a cylinder.

To this end, the member 280 is movable toward and from the bottle, being pivoted at 281 on the frame 265 and urged away from the bottle by a spring 282. The bottle can readily come to an indexed position without any interference from the member 280, whereupon the member 280 can be moved in against the bottle. For so moving the member 280 a cam 285 is provided on the projectable tube 173, engageable with a follower 286 on the upper arm portion of member 280. Thus as the nozzle 174 is projected into the bottle, member 280 is forced against the waist of the bottle. As seen from the comparison of FIGS. 15 and 16 the edge 280a of member 280 has the same curvature as the central portion of a side of the largest lower part of the bottle. Thus a portion of the waist is brought to this same curvature. The area to be labeled then corresponds to a part of a cylindrical surface.

Although the normal bottle waist is shown in FIG. 17 as having a normally constant radius portion which however does not coincide with the radius of the corresponding portion of the larger part of the bottle shown in FIG. 15, the invention is equally applicable where there is no such normally constant radius at the section to be distorted. For example, if the section at FIG. 17 where truly oval, the normal contour could not be said to have any constancy of radius, but a curvature corresponding to that of the edge 280a and the corresponding part of the contour of FIG. 14 could be obtained by this same apparatus.

The feature of the member 280 being movable into and out of engagement with the bottle may be usefully used even in cases where the waist of the bottle has normally the proper contour, as was assumed in the first embodiment, and it is mainly desired to confine and restrain the bottle against distortion rather than to bring the bottle to a new shape by distortion.

At the transfer line pressure is exerted upon the bottle through the label-carrier strip by the iron surface. I find it desirable to confine the label receiving area of the bottle substantially completely from top to bottom as this area is approaching the transfer line. The pressure at the transfer line otherwise tends to bulge the plastic bottle toward the rear side of the transfer line, in effect creating a backward wave of the bottle material in rear of the transfer line. Since clear transfer of the image from the label carrier strip to the plastic bottle surface is the object, and travel of the bottle surface area and the iron at identical speed is the means for securing this clear transfer, it is desirable to avoid such backward bulging or wave action.

The mechanism of FIGS. 18 and 19 is applicable to both embodiments of the invention but is shown separately to avoid obstructing views of other parts. It may be taken as proportioned and designed for the second embodiment of FIGS. 11 to 17.

A member 300 comprising a vertically disposed plate 301 and upper and lower horizontally disposed plates 302 and 303 is pivoted on a post 305 which at its bottom is set into the stationary bed of the machine and at its top is carried by a bracket 307 fast to the tube 153.

As shown in FIG. 18 member 300 is adapted to present a curved surface to the bottles, concentric with the axis X of the turret, this curved surface extending from a place which is in the region of for example about 80° in advance of the transfer line up to almost the transfer line itself. Member 300 shapes the bottle area which it engages to cylindrical contour. The member 300 is chamfered at 301a in the region of the path of the iron I, and permits the iron to operate at the transfer line without the member 300 there shielding the bottle from the pressure of the iron. Nevertheless, the bottle label receiving surface from top to bottom is confined and restrained by member 300 as it approaches the transfer line. The provision of this member 300, of course, either involves omitting parts of the guide wires or strips which guide the exposed side of the bottle as at 309, (FIG. 2 or FIG. 11), or else disposing these at levels where they will not interfere with the member 300 as it acts on the label receiving surface. Wires or strips 309 are left in FIGS. 2 and 11 on the assumption that they are so located as to avoid interference with member 300.

The lower horizontal plate 303 of member 300 includes a crank extension 303a connected to a plunger 311 of an actuating cylinder 313 adapted to move the member 300 between its full line position and its broken line position of FIG. 18. Adjustable stops 315, 316 limit this movement. The actuating cylinder is timed to cause the member 300 to occupy its full line position where it confines and restrains the bottle surface from a little before the time the raised sector of the iron reaches the transfer line until a little after the time when the raised sector leaves the transfer line, whereupon the member 300 is moved by the actuating cylinder to the broken line position where it readily admits the succeeding bottle.

The actuating cylinder may, if desired, be operated in synchronism with and from the same intermittently applied air source as the actuating cylinder 172 which causes the projection and retraction of the bottle inflating nozzle. Thus, when this latter actuating cylinder is constructed, as in my said Patent No. 3,064,714, so as to cause its actuated plunger to move outwardly under the influence of a spring when air pressure is automatically removed from a piston, and to retract when air pressure is automatically applied to the piston, the actuating cylinder 313 is constructed to operate in the same manner.

It will be undersood that the chamfered tip portion 300a of member 300 only occupies its broken line position of FIG. 18 at times when an applicator die is not passing.

With either embodiment of the invention, a die cycle may be considered to be the time of one revolution of the applicator or iron I divided by the number of raised die sectors which the applicator has. Thus, the cycle of a single iron is the time for revolution through 360°, the cycle of a double iron is the time for revolution through 180°, and the cycle of a triple iron is the time for revolution through 120°. In any of these cases, one raised sector, one bottle and one label will be presented at the transfer line each die cycle.

A cam cycle, during which cam 38 makes one revolution, is the same in time as the die cycle.

A half-cycle of the die or of the cam is, of course, one half of the full cycle.

Since the applicator rotates continuously designation of a beginning of the die cycle is in a sense arbitrary. However, it is useful to consider a die cycle as beginning at a time at which the cam 38 is at an end of a stroke and the slide 11 is at an end of a stroke, and at which time there will be neither die surface nor bottle at the transfer line. With a die cycle chosen thus, the transfer of one label will not involve more than one die cycle, and actual transfer will occur altogether within one or the other of the two halves of this cycle.

In FIG. 1 the double iron I has two raised die segments 17 each of which rotates 180° for 360° rotation of the cam 38. Clockwise rotation of 45° of the iron I and 90° of the cam 38 will bring a die segment 17 to the beginning of one of its half cycles and the cam 38 to the beginning of its corresponding half cycle. This half cycle, beginning at this point, will involve 90° rotation of the die, during which it will pass through its line of action or transfer line and apply a label and will involve 180° rotation of the cam 38. In this half cycle in which a die surface passes the transfer line, the turret will be indexed through a predominant part of 180°, more particularly 120°. On the next succeeding half cycle in which no die surface passes the transfer line the turret will be indexed through the remaining lesser part of the 180°, more particularly 60°.

The cam 38 will have equal and opposite strokes during these two half cycles and the slide 11 carrying guide rolls 8 and 9 will have equal and opposite strokes of a length determined by the setting of cam 26.

It will be understood that in the description of the mechanism of FIG. 11 and subsequent figures, features which have already been described in connection with FIGS. 1 to 10C are not again described in cases where repetition of such description seems unnecessary.

I claim:

1. In a heat transfer labeling machine rotary applicator die and a bottle turret for carrying bottles past the line of action of the die by rotation of the turret, the axes of rotation of the die and turret being parallel and the turret having a bottle-supporting platform downwardly inclined outwardly from the turret axis, and bottle-holding means cooperating with the platform to present outwardly-facing label-receiving areas of tapering bottle portions in parallel concentric relation to the turret axis as these pass the line of action of the die.

2. In a heat transfer labeling machine a rotary applicator die and a bottle turret for carrying distortable bottles past the line of action of the die by rotation of the turret, the axes of rotation of the die and turret being parallel and the turret having a bottle-supporting platform downwardly inclined outwardly from the turret axis, bottle holding means cooperating with the platform to present outwardly-facing label-receiving areas of tapering bottle portions in parallel concentric relation to the turret axis as these pass the line of action of the die, the machine including bottle inflating means for maintaining the bottles in an inflated condition in passing said line and bottle-restraining means for restraining portions of the bottles to such concentric relation.

3. A heat transfer labeling machine including a cyclically operating applicator die and an intermittently rotatable turret for carrying bottles past the line of action of the die and means for conducting a label-carrier strip between the die and bottle for transfer of an image from the strip to the bottle, the turret having two diametrically opposed bottle carrying stations to and from which bottles are delivered, a cycle of operation of the die being two half cycles, in one of which half cycles the die acts to cause a transfer and in the other of which half cycles the die does not so act, and driving mechanism imparting a predominant part of a 180° rotation to the turret during a half cycle of the die in which the die acts to cause a transfer and the remaining lesser part of said 180° rotation during the next half cycle of the die in which the die does not so act.

4. A heat transfer labeling machine including a continuously rotatable segmental applicator die, an intermittently rotatable turret for carrying bottles past the line of action of the die and means for conducting a label-carrier strip between the die and bottle for transfer of an image from the strip to the bottle, the turret having two diametrically opposed bottle carrying stations to and from which bottles are delivered, an oscillating member movable back and forth in timed relation to the rotation of the die, a die segment passing said line of action during one stroke of oscillation of said member in one direction and no die segment passing said line of action during the succeeding stroke of said member in the other direction, and driving connections from said oscillating member to the turret effective to rotate the turret through a predominant part of 180° rotation during said one stroke and through the remaining lesser part of said 180° rotation during the next succeeding stroke.

5. A heat transfer labeling machine including a periodically operable applicator die, an intermittently rotatable turret for carrying bottles past the line of action of the die and means for conducting a label-carrier strip between the die and bottle for transfer of an image from the strip to the bottle, the turret having two diametrically opposed bottle carrying stations to and from which bottles are delivered, an oscillating member movable back and forth in timed relation to the operation of the die, two one-way driving connections between the oscillating member and turret, one said connection being effective to rotate the turret during oscillation of said member in one direction and the other said connection being effective to rotate the turret during oscillation of said member in the other direction.

6. A heat transfer labeling machine including a periodically operable applicator die, an intermittently rotatable turret for carrying bottles past the line of action of the die and means for conducting a label-carrier strip between the die and bottle for transfer of an image from the strip to the bottle, the turret having two diametrically opposed bottle carrying stations to and from which bottles are delivered, an oscillating member movable back and forth in timed relation to the operation of the die, two one-way driving connections between the oscillating member and turret, one said connection being effective to rotate the turret during oscillation of said member in one direction and the other said connection being idle during the initial part of the succeeding stroke of said member in the other direction and then being effective to rotate the turret an amount representing the difference between 180° and the rotation derived through the other one-way connection.

7. A heat transfer labeling machine as claimed in claim 6 in which the machine includes means for delivering a bottle to a bottle-carrying station of the turret while said other one-way driving connection is idle in said succeeding stroke.

8. A heat transfer labeling machine including an applicator die operating periodically at a line of action and an intermittently rotatable turret for carrying bottles past the line of action of the die and means for conducting a label-carrier strip between the die and bottle for transfer of an image from the strip to the bottle at each of the operations of the die, the turret having two diametrically opposed bottle carrying stations to and from which bottles are delivered, a cam rotatable in timed relation to the operation of the die at the rate of one revolution of the cam per operation of the die, the timing being such that the transfer occurs during one half revolution of the cam, and driving connections from said cam to the turret effective during said one half revolution of the cam to rotate the turret through a predominant part of a 180° rotation of the turret and effective during the next succeeding half revolution of the cam to rotate the turret through the remaining lesser part of said 180° rotation.

9. A heat transfer labeling machine including a continuously rotatable segmental applicator die and an intermittently rotatable turret for carrying bottles past the line of action of the die and means for conducting a label-carrier strip between the die and bottle for transfer of an image from the strip to the bottle, the turret having two diametrically opposed bottle carrying stations to and from which bottles are delivered, a cam rotatable in timed relation to the rotation of the die at the rate of one revolution of the cam per passage of a die segment past said line of action, strip guiding means in advance of and following the line of action of the die movable back and forth for locally modifying the speed of the label-carrier strip in the region of the die, driving connections from said cam to said strip guiding means equally effective in opposite directions during successive half revolutions of said cam, and driving connections from said cam to the turret effective during one half revolution of the cam in which a die segment moves past said line of action to rotate the turret through a predominant part of a 180° rotation of the turret and effective during the next succeeding half revolution of the cam to rotate the turret through the remaining lesser part of said 180° rotation.

10. A heat transfer labeling machine including an applicator die operating periodically at a line of action and an intermittently rotatable turret for carrying bottles past the line of action of the die and means for conducting a label-carrier strip between the die and bottle for transfer of an image from the strip to the bottle at each of the operations of the die, the turret having two diametrically opposed bottle carrying stations to and from which bottles are delivered, a cam rotatable in timed relation to the operation of the die at the rate of two oppositely directed strokes of the cam per operation of the die, the timing being such that the transfer occurs during a stroke of the cam in one direction, and driving connections from said cam to the turret effective during said stroke of the cam in said direction to rotate the turret through a predominant part of a 180° rotation of the turret and effective during the next succeeding opposite stroke of the cam to rotate the turret through the remaining lesser part of said 180° rotation.

11. A heat transfer labeling machine for distortable bottles including means for inflating the bottles, a rotary turret for carrying the bottles past a transfer line in inflated condition and a rotary transfer die acting at the transfer line, a member having an arcuate surface portion engageable with a bottle on the turret, said member being movable from an open position for reception of a bottle to a closed position for constraining the bottle, said arcuate surface portion in said closed position being concentric with the turret axis.

12. A heat transfer labeling machine including a rotary transfer die, means for conveying a continous label-carrier strip past the die, a rotatable turret for carrying bottles bodily past the line of action of the die in pressure contact with the label-carrier strip with such pressure opposed by the die, bottle inflating means for maintaining the bottle inflated during the transfer, and a member having an arcuate surface engageable with the exterior of the bottle at the line of action of the die adjacent to but outside of the range of action of the die.

13. A heat transfer labeling machine including a rotary transfer die, means for conveying a continuous label-carrier strip past the die, a rotatable turret for carrying bottles bodily past the line of action of the die in pressure contact with the label-carrier strip with such pressure opposed by the die, bottle inflating means for maintaining the bottle inflated during the transfer, and a member moving with the bottle and having an arcuate surface engageable with the exterior of the bottle at the line of action of the die adjacent to but outside of the range of action of the die and thereafter moving in the reverse direction, opposite to the direction of rotation of the turret, to engage a succeeding bottle.

14. A heat transfer labeling machine including a rotary transfer die, means for conveying a continuous label-carrier strip past the die, a rotatable turret for carrying bottles bodily past the line of action of the die in pressure contact with the label-carrier strip with such pressure opposed by the die, means for maintaining the bottle inflated during the passage of the bottle past said line and resulting transfer thereat, and a member moving with the turret and having an arcuate surface engageable with the exterior of the bottle at the line of action of the die adjacent to but outside of the range of action of the die, said arcuate surface being concentric with the axis of turret rotation.

15. A heat transfer labeling machine for distortable bottles, the machine including means for inflating the bottles and conveying them past the transfer line in inflated condition, and a rotary transfer die acting at the transfer line, the bottle-carrying means including a rotary turret, characterized by a bottle-confining member having a concave cylindrical surface engaging the label-receiving area of a bottle substantially throughout the height of the label-receiving area as this area of a bottle of the turret approaches the transfer line, said cylindrical surface of the confining member extending near to the transfer line but terminating short thereof.

16. A heat transfer labeling machine as claimed in claim 15 including means for holding the bottle-confining member alternatively in a bottle-confining position in which its cylindrical surface is concentric with the turret axis, for movement of the label-receiving area of the bottle past the transfer line, and in another position affording more space for reception of a bottle between the member and turret axis.

References Cited by the Examiner

UNITED STATES PATENTS

| | | | |
|---|---|---|---|
| 2,981,432 | 4/61 | Flood | 156—567 |
| 3,058,514 | 10/62 | Flood | 156—542 |

FOREIGN PATENTS 434,548  9/26  Germany.

EARL M. BERGERT, *Primary Examiner.*